Nov. 7, 1961   G. H. DRUMMOND   3,007,644
TEMPERATURE CONTROL VALVE
Filed Feb. 19, 1960

INVENTOR.
GEORGE H. DRUMMOND
BY
William Frederick Werner.
ATTORNEY

3,007,644
TEMPERATURE CONTROL VALVE
George H. Drummond, Warwick, R.I., assignor to Leonard Valve Company, Cranston, R.I., a corporation of Rhode Island
Filed Feb. 19, 1960, Ser. No. 9,981
5 Claims. (Cl. 236—12)

This invention relates to a temperature control valve and more particularly to a valve in which a stream of hot water passes through the valve; the valve controlling the flow of cold water through the valve.

One of the objects of the present invention is to provide a temperature control valve which limits the upper temperature of the hot water passing from the valve; i.e., to prevent scalding water from flowing out of the temperature control valve when scalding water enters the valve.

Another object of the present invention is to provide a temperature control valve having a continuous unrestricted flow of hot water through the valve and a means to control the mixing of the cold water with the hot water.

Still another object of the present invention is to provide a manual flow control for the hot water and an automatic thermostatic control for the cold water in a temperature control valve.

Another object of the present invention is to provide a temperature control valve with a minimum of parts, inexpensive to manufacture and free of servicing after installation.

Other objects of the present invention will be pointed out in part and become apparent in part in the following specification and claims.

Referring to the drawings, in which similar characters of reference refer to similar parts in all the views.

Figure 1:
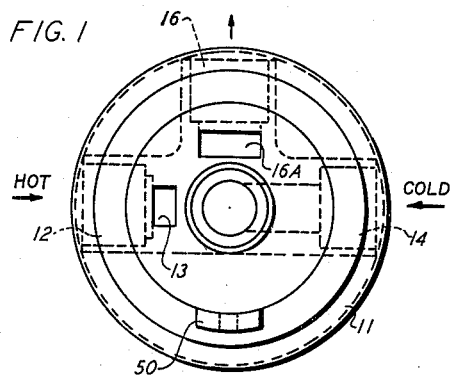
FIGURE 1 is a plan view of the base showing the relative location of the various ports.
Figure 2:
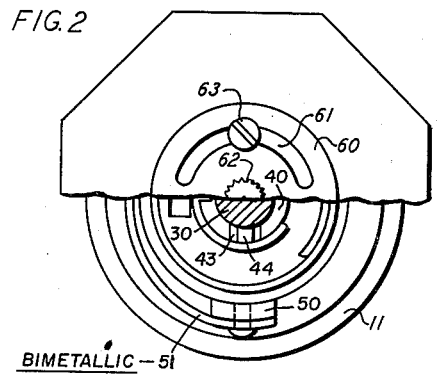
FIGURE 2 is a plan view, with a section broken away for clarity of the new and improved temperature control valve.
Figure 3:
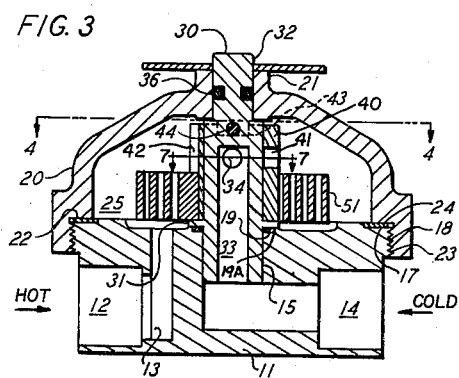
FIGURE 3 is a vertical cross sectional view, taken on the center line, of the new and improved temperature control valve.
Figure 4:
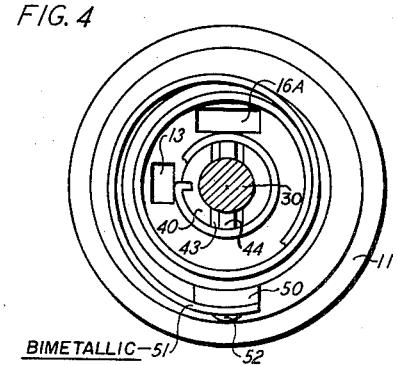
FIGURE 4 is a horizontal cross sectional view taken along line 4—4 of FIGURE 3 with the cover removed for clarity and with the bi-metallic thermostatic coil element mid-section removed for clarity.

The present temperature control valve consists of a base 11 provided with a horizontal hot water inlet port 12 having a vertical extension 13. A horizontal cold water inlet port 14 is also provided, having a vertical extension 15. As illustrated, the hot water inlet port 12 and the cold water inlet port 14 are in diametric horizontal alignment. Base 11 is also provided with an outlet port 16 (having a vertical passageway 16A) located ninety degrees from and in horizontal alignment with hot water inlet port 12. Base 11 is provided with a circular flange 17, an external threaded area 18 and a packing seat 19, for purposes which will presently appear.

A cover 20 dome shaped, is provided with a cored axially located hub 21, a shoulder 22 and an internal threaded area 23.

Cover 20 is removably secured to base 11 through threaded areas 18, 23 with a packing 24 interposed between circular flange 17 and shoulder 22 to form a fluid tight seal. A fluid mixing chamber 25 is thus provided.

A pointer rod 30 is provided having an external circular flange 31, a reduced external area forming a bearing 32 and an axial vertical cold water conduit 33 having a plurality of ports 34. Bearing 32 is provided with a circular groove adapted to house a packing 36. Pointer rod 30 is rotatively mounted in cored axially located hub 21 on one end and in vertical outlet 15 on the other end with a packing 19A interposed between flange 31 and base 11.

A rotor 40 is provided with a plurality of ports 41, a vertical groove 42 and an axial bearing adapted to be rotatively mounted upon pointer rod 30 with ports 34, registrable with ports 41. Rotor 40 is rotatively supported upon circular flange 31. Rotor 40 is provided with a horizontal groove 43.

A pin 44 secured in pointer rod 30 extends beyond the ends of rod 30 so that its opposite ends lie in groove 43 and engage the walls thereof as will presently appear.

A boss 50 projects upwardly from base 11. A bi-metallic element 51 thermally responsive, coil wound is secured on its inner end in vertical groove 42 and on its outer end to boss 50 as by a screw or rivet 52. Element 51 is located in fluid mixing chamber 25.

A dial plate 60 provided with an arcuate slot 61 is secured to pointer rod 30 by means of serrations 62. A screw 63 is rotatively mounted to cover 20. Dial plate 60 through arcuate slot 61 rotates around screw 63 and is held in pre-selected position by screw 63.

The present temperature control valve has particular application for use in a hot water line leading to a domestic sink, wash tub, clothes washing machine, automatic dish washer or shower nozzle. Hot water from a boiler is conducted to hot water inlet port 12. This hot water if allowed to flow from a faucet could scald a person's hand especially when the hot water is from a supply servicing an apartment house or other multiple dwelling. It could be too hot for domestic use. Therefore, the temperature control valve is pre-set at the factory by turning dial plate 60 to a pre-selected position. Screw 63 locks dial plate 60 in that pre-selected position. The hot water temperature flowing from the valve will be stamped on dial plate 60. The turning of dial plate 60, turns pointer rod 30, thereby placing ports 34 in a selected position. The dial plate 60 will carry markings indicating which way it is to be turned to increase or decrease the temperature of the water.

The hot water flowing through vertical passageway 13 will strike the convolutions of bi-metallic coil 51. A spraying and swirling action will be imparted to the water. Bi-metallic coil element 51, being thermally responsive will rotate, thereby rotating rotor 40. If the hot water striking bi-metallic element 51 is hot enough, the coil will cause rotor 40 to rotate a distance sufficient to align or register ports 41 with ports 34. In that event, cold water flowing from cold water inlet port 14 and vertical cold water conduit 33 will pass through the plurality of ports 34, 41 jetting streams of water into fluid mixing chamber 25. The force of the jetting water will add to the swirling motion of the hot water and thereby add to the mixing of the hot and cold water in fluid mixing chamber 25. The mixture of hot and cold water in fluid mixing chamber 25 will act upon bi-metallic coil element 51 to rotate rotor 40 and thereby effect the alignment or registry of ports 41 with ports 34 to reduce or increase the flow of cold water into fluid mixing chamber 25.

The bi-metallic coil element 51 consists of two elements. One of the elements is activated by a heat change. The other element remains inactive. When these elements are wound into a coil, distortion or twisting takes place as one element becomes active. This distortion or twisting causes a rotor to cramp or bind upon a pointer rod. This distortion is greatest in a bi-metallic coil because the outer convolutions are the first to react to heat because they have the greatest freedom of movement.

In order to reduce this distortion to an ineffectual amount applicant provides three or four port combinations of ports 34, 41. In this manner, the cold water is evenly distributed over the coil area. Ports 41 could be placed on an angle to direct the jets of cold water toward the convolutions of the coil.

Figure 5:
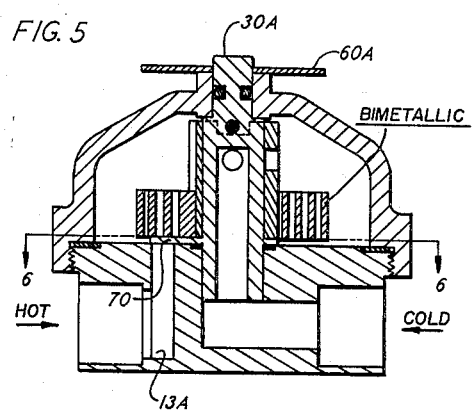
FIGURE 5 is a view, similar to FIGURE 3, illustrating a modified structure; one for interrupting the flow of hot water through the temperature control valve.
Figure 6:
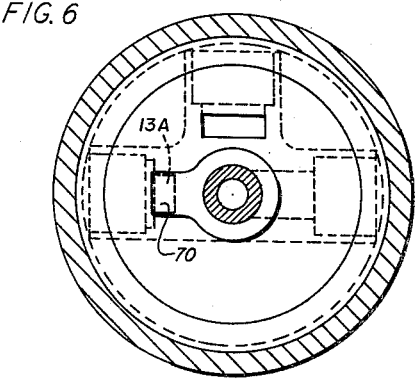
FIGURE 6 is a horizontal cross sectional view taken along line 6—6 of FIGURE 5.
Figure 7:
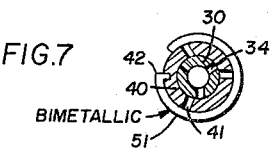
FIGURE 7 is a transverse cross sectional view taken on line 7—7 of FIGURE 3.
Figure 8:
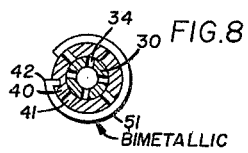
FIGURE 8 is a view similar to FIGURE 7 illustrating four port combinations between the pointer rod and the rotor.

A rotor rotatively mounted upon a pointer rod provides a structure relatively unaffected by the distortion of the bi-metallic coil element in conjunction with the location of the cold water jets. It has been found to be expedient and at times necessary to reduce the volume of hot water flowing through the temperature control valve. To that end, FIGURES 5 and 6 illustrate a modified form pointer rod. Pointer rod 30A is provided with a flange 70 to wholly or partially cover vertical fluid passageway 13A.

The manual rotation of dial plate 60A places flange 70 in selected position in relation to vertical fluid passageway 13A, to intercept or to not intercept the flow of hot water into mixing chamber 25. In all other respects the temperature control valve illustrated in FIGURES 5 and 6 is identical with the construction illustrated in FIGURES 1 thru 4.

Pin 44 and slot 43 limit the relative rotation of pointer rod 30 in relation to rotor 40. If dial plate 60 is rotated a sufficient amount it will cause rotor 40 to rotate and thereby open or close the convolutions on bi-metallic coil element 51, thus effecting the thermal actuation of bi-metallic coil element 51.

Having shown and described a preferred embodiment of the present invention, by way of example, it should be realized that structural changes could be made and other examples given without departing from either the spirit or scope of this invention.

What I claim is:

1. A temperature control valve consisting of a base having a horizontal hot water inlet port provided with a vertical extension, a horizontal cold water inlet port having a vertical extension, a horizontal outlet port having a vertical passageway, a circular flange, a packing seat and an external thread, a cover, dome shaped, provided with a cored axially located hub, a shoulder, and an internal thread, said cover removably secured to said base by means of said external and internal threads with a fluid tight packing interposed between said shoulder and said circular flange, a mixing chamber formed between said base and said cover with said vertical extensions for the hot and cold water inlet ports and said vertical passageway for said outlet port communicating with said mixing chamber, a pointer rod provided with an external flange, a bearing, an axial vertical cold water conduit having a plurality of ports, said pointer rod rotatively mounted in said cored axially located hub by means of said bearing, a fluid tight packing between said bearing and said cored axially located hub, said pointer rod projecting into said cold water inlet port vertical extension, a fluid tight packing in said packing seat, said external flange engaging said last mentioned fluid tight packing, a rotor having a plurality of ports, a vertical groove and an axial bearing, rotatively mounted upon said pointer rod with said last mentioned ports engageable and disengageable with said first mentioned ports, a boss on said base, a bi-metallic coil element secured on one end in said vertical groove and on the other end to said boss, a groove in said rotor, a pin in said pointer rod located in said groove to limit the relative movement of said rotor in relation to said pointer rod, a dial plate, provided with an arcuate slot, secured to said pointer rod whereby manual rotation of said dial plate rotates said pointer rod to a pre-selected position and through said pin and groove rotates said rotor to a pre-selected position in relation to said bi-metallic coil element and means to secure said dial plate through said arcuate groove in said pre-selected position.

2. A temperature control valve consisting of a base, a dome shaped cover secured to said base, a fluid mixing chamber formed between the top of said base and said dome shaped cover, a single hot water inlet port, a cold water inlet port and a single outlet port provided in said base, said single hot water inlet port and said single outlet port being in direct registry with said mixing chamber, a pointer rod, having a cold water conduit, rotatively mounted on one end in said cover and on the opposite end in said cold water inlet port to provide an extension of said cold water inlet port, a plurality of ports in said pointer rod providing communication between said cold water inlet port and said mixing chamber, a rotor having a plurality of ports, rotatively mounted upon said pointer rod with said last mentioned plurality of ports moving into and out of alignment with said first mentioned plurality of ports to provide communication and to block communication of said cold water inlet port with said mixing chamber, means limiting the relative rotation between said pointer rod and said rotor, and thermally responsive means located in said fluid mixing chamber rotating said rotor in relation to said pointer rod whereby hot water flowing from said hot water inlet port into said mixing chamber mixes with cold water from said cold water inlet port to thermally actuate said thermally responsive means and thereby rotate said rotor to align or move out of alignment the plurality of ports in said rotor with the plurality of ports in said pointer rod to change the volume of cold water entering said fluid mixing chamber.

3. A temperature control valve consisting of a base, a dome shaped cover secured to said base, a fluid mixing chamber formed between the top of said base and the inside of said dome shaped cover, a hot water inlet port, a cold water inlet port, and an outlet port, provided in said base, said hot water inlet port and said outlet port being in communication with said fluid mixing chamber, a pointer rod, having a cold water conduit and a flange, rotatively mounted on one end in said cover and on the opposite end in said cold water inlet port to provide an extension of said cold water inlet port, a plurality of ports in said pointer rod providing communication between said cold water inlet port and said fluid mixing chamber, said flange rotating into and out of registry with said hot water inlet port, a rotor having a plurality of ports, rotatively mounted upon said pointer rod with said last mentioned plurality of ports moving into and out of registry with said first mentioned plurality of ports to provide communication and to block communication of said cold water inlet port with said fluid mixing chamber, means limiting the relative rotation between said pointer rod and said rotor, and a bi-metallic coil element located in said mixing chamber with one end of said bi-metallic coil element secured to said rotor and the other end secured to said base, whereby the hot and cold water mixture in said mixing chamber thermally actuates said bi-metallic coil element to rotate said rotor, manual rotation of said pointer rod positioning said flange in relation to said hot water inlet port to control the flow of hot water into said mixing chamber.

4. A temperature control valve consisting of a base, a dome shaped cover secured to said base, a fluid mixing chamber formed between the top of said base and the inside of said dome shaped cover, a hot water inlet port, a cold water inlet port, and an outlet port, provided in said base, said hot water inlet port and said outlet port being in communication with said fluid mixing chamber, a pointer rod, having a cold water conduit and a flange, rotatively mounted on one end in said cover and on the opposite end to said cold water inlet port to provide an extension of said cold water inlet port, a plurality of ports in said pointer rod providing communication between said cold water inlet port and said fluid mixing chamber, said flange rotating into and out of registry with said hot water inlet port, a rotor, having a plurality of ports, rotatively mounted upon said pointer rod with said last mentioned plurality of ports moving into and out of registry with said first mentioned plurality of ports to provide communication and to block communication of said cold water inlet port with said fluid mixing chamber, means limiting the relative rotation between said pointer rod and said rotor, and thermally responsive means located in said fluid mixing chamber rotating said rotor in relation to said pointer rod, manual rotation of said pointer rod positioning said flange in relation to said hot water inlet port to control the flow of hot water into said mixing chamber.

5. A temperature control valve consisting of a base, a dome shaped cover secured to said base, a fluid mixing chamber formed between the top of said base and the inside of said dome shaped cover, a hot water inlet port, a cold water inlet port, and an outlet port, provided in said base, said hot water inlet port and said outlet port being in communication with said fluid mixing chamber, a pointer rod, having a cold water conduit rotatively mounted on one end in said cover and on the opposite end to said cold water inlet port to provide an extension of said cold water inlet port, a plurality of ports in said pointer rod providing communication between said cold water inlet port and said fluid mixing chamber, a rotor, having a plurality of ports, rotatively mounted upon said pointer rod with said last mentioned plurality of ports moving into and out of registry with said first mentioned plurality of ports to provide communication and to block communication of said cold water inlet port with said fluid mixing chamber, means limiting the relative rotation between said pointer rod and said rotor, and thermally responsive means located in said fluid mixing chamber rotating said rotor in relation to said pointer rod, and mechanical means actuated by the manual positioning of said rotor for controlling the flow of hot water from said hot water inlet port into said fluid mixing chamber.

References Cited in the file of this patent
UNITED STATES PATENTS

| | | |
|---|---|---|
| 1,957,276 | Leonard | May 1, 1934 |
| 2,199,416 | Paulson | May 7, 1940 |

FOREIGN PATENTS

| | | |
|---|---|---|
| 773,505 | France | Sept. 3, 1934 |
| 16,179 | Great Britain | 1913 |